United States Patent [19]

Walters et al.

[11] 4,201,594
[45] * May 6, 1980

[54] METHOD FOR MAKING REFRACTORY ARTICLES

[75] Inventors: Ian R. Walters, Huddersfield; Harold G. Emblem, Mirfield, both of England

[73] Assignee: Zirconal Processes Limited, Bromley, England

[*] Notice: The portion of the term of this patent subsequent to Apr. 17, 1994, has been disclaimed.

[21] Appl. No.: 875,411

[22] Filed: Feb. 6, 1978

Related U.S. Application Data

[60] Continuation-in-part of Ser. No. 748,702, Dec. 8, 1976, abandoned, which is a division of Ser. No. 561,347, Mar. 24, 1975, Pat. No. 4,025,350.

[51] Int. Cl.$^2$ ............................................... B25B 7/28
[52] U.S. Cl. ............................... 106/38.35; 106/38.3; 106/38.5 R; 106/57; 106/58; 164/12; 264/63
[58] Field of Search .................. 106/38.3, 38.35, 57, 106/58, 65, 38.5 R; 264/63; 164/12

[56] References Cited

U.S. PATENT DOCUMENTS

| 3,232,771 | 2/1966 | Pearce | 106/38.35 |
| 3,607,319 | 9/1971 | Scott | 106/38.35 |
| 4,018,858 | 4/1977 | Walters et al. | 106/58 |
| 4,025,350 | 5/1977 | Walters et al. | 106/38.35 |

FOREIGN PATENT DOCUMENTS 979197  1/1965  United Kingdom.

Primary Examiner—Lorenzo B. Hayes
Attorney, Agent, or Firm—Christensen, O'Connor, Johnson & Kindness

[57] ABSTRACT

The invention concerns the binding of refractory powders into self-supporting 'green' shapes which are fired to provide refractory objects. In accordance with the invention the binders are based on zirconium salts and include a separate gell time delaying agent to ensure satisfactory gelling and to achieve control and to allow complex shapes to be made.

2 Claims, No Drawings

METHOD FOR MAKING REFRACTORY ARTICLES

This application is a continuation in part of Ser. No. 748,702, filed Dec. 8, 1976, now abandoned, which in turn is a divisional application of Ser. No. 561,347, filed Mar. 24, 1975 (now U.S. Pat. No. 4,025,350), the benefits of the filing dates of which are hereby claimed under 35 USC 120. Reference is also made to U.S. application Ser. No. 561,245 (now U.S. Pat. No. 4,018,858) of even date corresponding to U.K. application No. 13834/74.

This invention relates to the manufacture of refractory articles. More specifically the invention relates to a manufacturing process wherein a flowable liquid slurry of a refractory power dispersed in a liquid binder is prepared and poured into an appropriately shaped mould and allowed to set by gellation of the binder. The set moulded shape, referred to as the 'green' shape, is then removed from the mould and fired into a sintered refractory mass.

For such a process to be commercially successful the following parameters have to be satisfied:

1. The binder and the refractory particles must be capable of producing a slurry which is sufficiently fluid to fill a complex mould.
2. The gelling time of slurry should, preferably, be controllable. Thus to produce a simple shape such as a rectangular block the moulding operation can be carried out rapidly and, in order to achieve an economically viable process when a single mould is used, the setting of the binder should be caused to take place as rapidly as possible. In the case of a complex shape, such as a burner part, however, filling and handling of the mould is a slower operation and the gellation should be correspondingly delayed.
3. The 'green' shape should have reasonable strength to allow a complex shape to be removed from the mould and transported to a drying oven and then to a firing furnace. The breakage of a green shape wastes valuable material, the setting of the binder being an irreversible process, and time.
4. After firing the binder should leave a matrix which effectively binds the refractory particles together.
5. After firing the binder should leave only highly refractory residues to constitute the matrix.

In the past binders derived from organic silicates which hydrolyse under appropriate conditions to give silicic acid have been widely used. Silicic acid gels to set the slurry and after firing leaves silica as the refractory matrix holding the refractory grains together. Silica is a refractory oxide and is recognised as such, but its refractory properties do not compare favourably with the refractory properties of, for example, alumina and zirconia. Additionally, ethyl silicate being manufactured from ethyl alcohol, which is a petroleum-derived product, is becoming increasingly expensive.

It is an objective of the present invention to provide a binder for refractory powders such binder being based on zirconium compounds which binder after firing leave a highly refractory residue of zirconia as the principal constituent refractory matrix.

U.K. No. 979,197 of the Zirconium Corporation of America relates to a refractory cement consisting of a dry matrix of refractory powders, binder and gelling agent which when wet and worked into a viscous self-supporting consistency can be 'trowelled' into moulds to form simple shapes. Group IVB organic salts such as zirconium acetate are suggested as binders. The parameters set out above are not necessary as, at cement consistencies, control of gellation is not significant as the cement in itself is sufficiently coherent to form a rigid shape. The compositions referred to in this specification are not liquid flowable slurries capable of being poured into and filling the cavities of complex moulds.

U.S. Pat. No. 3,203,812 of Unilever Limited, relates to organic zirconium esters which are covalent complexes and have to be dissolved in expensive and inconvenient organic solvents such as carbon tetrachloride. The techniques of this Patent Specification are costly and complex.

According to the present invention there is provided a method of making refractory articles such method comprising the steps of:

(a) preparing a liquid binder by mixing an aqueous solution of a zirconium salt with a gellation-inducing agent selected from the group consisting of the amino alcohols, morpholine, dead burned magnesia powder and powdered magnesia-containing spinels, when the zirconium salt is acid and the dead burned magnesia powder and powdered magnesia-containing spinels only when the zirconium salt is basic and with a gellation-delaying agent selected from the group consisting of magnesium salts, ammonium lactate, ammonium chloride compounds which in solution form dipolar (Zwitter) ions, monosaccharides and the polyhydric alcohols, triethanolamine hydrochloride and acetic acid being additional to the last mentioned group when the gellation-inducing agent is triethanolamine, and alkali metal borates being additional to the last mentioned group when the gell-inducing agent is the dead burned magnesia or powdered magnesia containing spinel.

(b) mixing a refractory powder with the liquid binder and forming a liquid flowable slurry.

(c) pouring the slurry into a mould to fill the cavities of the latter.

(d) allowing the slurry in the mould to set to a coherent green shape.

(e) drying and firing the green shape into a sintered refractory mass.

The terms 'heavy and light' in calcined magnesia powder refer to bulk density and particle size. Thus 'heavy' calcined magnesia powder has relatively large grains and relatively high bulk density. 'Light' calcined magnesia has relatively small particles and a relatively low bulk density. Typically 20 g light calcined magnesia will occupy a volume of not less than 150 cc. Light calcined magnesia powder is preferred in the methods of the present invention wherein a separate gell controlling agent is used. The calcining operation carries out on the magnesia is preferably of short duration and to obtain a lightly calcined magnesia calcination is carried out typically between 600° and 900° C. This is in contrast to the 'dead burning' procedure wherein temperatures over 900° C. are used. In general terms 'dead burned' magnesia is less soluble in acids than 'calcined' magnesia. For a more detailed treatment reference is made to the 26th Extra Pharmacoepia 1972, page 137.

Further in accordance with the present invention there is provided a method of making a refractory article comprising:

(a) preparing a liquid, flowable slurry by combining a refractory powder, an aqueous solution of a zirconium salt which when dissolved in water yields an aqueous solution that is alkaline, a gellation-inducing agent, and a gellation-delaying agent; said gellation-inducing agent being selected from the group consisting of dead burned magnesia powder and powdered magnesia-containing spinel, and said gellation-delaying agent being selected from the group consisting of magnesium acetate, magnesium lactate, ammonium lactate, glycine, betaine, fructose, a polyhydric alcohol selected from the group glycerol, sorbitol and mannitol and the aminoalcohols; the amounts of refractory powder, solution of zirconium, salt, gellation-inducing agent and gellation-delaying agent being such that the slurry will set to a coherent state upon standing;

(b) pouring the slurry while liquid into a mould;

(c) allowing the slurry in the mould to set to form a coherent green shape; and, (d) removing the green shape from the mould, drying the green shape and firing the dried green shape to form a sintered refractory article. Specifically, ammonium zirconium carbonate can be used as the zirconium salt that yields the aqueous, alkaline solution.

Suitable aqueous solutions of the zirconium salt include aqueous solutions of zirconium acetate, zirconium oxychloride, zirconium formate (all acidic) and ammonium zirconium carbonate (basic).

Although any refractory powder may be used the system is especially suitable for use with zircon and zirconia also magnesia and other basic refractories, such as chrome magnesite systems. The system of the invention can also be used to bind acidic or neutral refractories such as alumina and silicon carbide. The fusion product of zircon sand and alumina is a suitable refractory aggregate.

The invention will now be further illustrated in the following Examples. The term 'gel' used hereinafter unless otherwise qualified signifies a coherent gel which will bind a powdered refractory:

EXAMPLES OF THE USE OF AMINOALCOHOLS AS GELL-INDUCING AGENTS FOR ZIRCONIUM ACETATE SOLUTION

Example I Diethanolamine as Gell Inducing Agent

The gelation agent was a solution of one volume of diethanolamine in one volume of water. This is solution A.

with 10.0 g magnesium acetate crystals (4H$_2$O) (gell time controlling agent) in 50 ml zirconium acetate solution,
  10 ml of this solution +3.0 ml solution A—gel in 20 seconds, strength improving on standing
  10 ml of this solution +2.5 ml solution A—a weak gel in 1 minute
with 15.0 g magnesium acetate crystals (4H$_2$O) in 50 ml zirconium acetate solution
  10 ml of this solution +3.0 ml solution A—good gel in 20 seconds
  10 ml of this solution +2.5 ml solution A—good gel in 20 seconds
  Diluted solution A by adding 1 volume of water to 1 volume of solution A, giving solution B 10 ml of Magnesium acetate/zirconium acetate solution +5 ml solution B=good gel in 20 seconds pH 8.5
  10 ml of Magnesium acetate/zirconium acetate solution +4.5 ml solution B—no gel in 20 minutes pH 7.0

Example II Triethanolamine as Gel Inducing Agent

The gelation agent was a solution of one volume of triethanolamine in one volume of water. This is solution C.

with 10 g magnesium acetate crystals (4H$_2$O) (gel time controlling agent) in 50 ml zirconium acetate solution.
  Using 10 ml of this solution, with given volumes of solution C
  3 ml—pH 6
  3.5 ml—pH 7
  4.0 ml—pH between 7 and 7.5, rubber like gel in 2 minutes
  4.5 ml—pH 7.5, rubber like gel in 30 seconds All pH determinations were made by using B.D.H. Universal Indicator solution. (Supplied by B.D.H. Chemicals Ltd., Poole).
with 15 g magnesium acetate crystals (4H$_2$O) in 50 ml zirconium acetate solution.
  Using 10 ml of this solution with 4.0 ml of solution C—gel in 2 minutes, a rubbery gel.
with 5 g magnesium acetate crystals (4H$_2$O) in 50 ml zirconium acetate solution.
  Using 10 ml of this solution with 4.0 ml solution C—gel in 1 minutes 15 seconds—gel now very flexible and rubbery.
  10 ml zirconium acetate solution, NO magnesium acetate crystals dissolved
with 4.0 ml solution C—gave localised gelation, not a coherent gel.

Conclude that magnesium acetate lengthens the gel time, also strengthens the gel.

Example III Triethanolamine/Acetic Acid Experiments

Dissolved 30 g triethanolamine in 30 ml water and added 12 g glacial acetic acid. This solution would not gel zirconium acetate solution. Needed 60 g triethanolamine to obtain a gel. The gel inducing solution (accelerator solution) used was made by dissolving 60 g triethanolamine in 30 ml water and adding 12 g glacial acetic acid.
  10 ml zirconium acetate solution with 6 ml accelerator solution, gel in 4 minutes, good strength development on standing.
with 10 g Magnesium acetate crystals (4H$_2$O) (gel controlling agent in 50 ml zirconium acetate solution.
  Using 10 ml of this solution with 6 ml accelerator solution, gel in 3½ minutes, a good gel.
  At this stage added a further 10 g triethanolamine to the accelerator solution.
  6 ml of the new accelerator solution with 10 ml zirconium acetate solution gave a good gel in about 1 minute.
  6 ml of the new accelerator solution with 10 ml of solution of magnesium acetate crystals (4H$_2$O) in 50 ml zirconium acetate solution gave a good gel in 3½ minutes.

Again note lengthening of gel time by magnesium acetate.

EXAMPLES DEMONSTRATING USE OF THE ZIRCONIUM ACETATE/MAGNESIUM ACETATE/TRIETHANOLAMINE SYSTEM IN THE PREPARATION OF SHAPED REFRACTORY OBJECTS

Example IV

A crucible was prepared by mixing 27 ml of a solution of magnesium acetate in zirconium acetate solution obtained by dissolving 20 g magnesium acetate crystals in 100 ml acetate solution ($ZrO_2$ 22% w/w), with 12 ml of a 50% aqueous solution of triethanolamine, then adding 200 g powdered Sillimanite mix. The resulting slurry was poured into the mould and allowed to set. After 10 minutes, the crucible was removed from the mould, air-dried and then fired at 1550° C. The fine sillimanite mix used in this Example and hereinafter was Molochite $-16+30$ grade—2 parts by weight
P.B. Sillimanite 100 CML grade—1⅔ parts by weight
Fused alumina $-100$ B.S. 410—⅓ part by weight

Example V

An element carrier was prepared by mixing in the order 27 ml solution of magnesium acetate in zirconium acetate (composition 10 g magnesium acetate ($4H_2O$) crystals dissolved in 100 ml zirconium acetate solution)
12 ml 50% aqueous solution of triethanolamine
400 g of a mixture of zircon and zirconia powders.

The resulting slurry was poured into the mould, which was vibrated. After 5 minutes, when the slurry had hardened, the carrier was removed from the mould, air-dried and fired at 1550° C.

Example VI

A crucible was prepared by mixing 17.5 ml solution of magnesium acetate in zirconium acetate (composition as in Example IV) with 7.5 ml 50% aqueous solution of triethanolamine, then adding 200 g fused alumina mix. The resulting slurry was poured into the mould, which was vibrated. When the slurry had hardened (after approximately 5 minutes) the crucible was removed from the mould, air-dried and fired at 1550° C. The fused alumina mix comprised $-3/16 + ⅛$—7%
$-⅛ + 1/16$—23%
$-1/16 + 22$—30%
$- -100$—40%

Percentages are by weight and the screen sizes are B.S. 410 sieves.

BASIC REFRACTORY AGGREGATES—USE OF MAGNESIUM ACETATE TO CONTROL SETTING TIME OF SLURRY

Example VII

Slurries were prepared by mixing 20 ml of the magnesium acetate-zirconium acetate solution with 100 g ore. A typical chemical analysis is Chrome oxide—24% as $Cr_2O_3$
Magnesium oxide—41% as $MgO$
Iron oxides—12% as $Fe_2O_3$
Aluminum oxide—20% as $Al_2O_3$
Silicon oxide—2% as $SiO_2$
Calcium oxide—1% as $CaO$
Specific gravity 3.85

EXAMPLES DEMONSTRATING THE USE OF THE ZIRCONIUM ACETATE/MAGNESIUM ACETATE SYSTEM IN THE PREPARATION OF SHAPED REFRACTORY OBJECTS FROM BASIC REFRACTORY POWDERS

Example VIII

A shaped refractory, suitable for use as an electric element carrier in electric furnaces, was prepared by mixing 45 ml of a solution of magnesium acetate in zirconium acetate (obtained by dissolving 10 g magnesium acetate crystals in 100 ml zirconium acetate solution) with 300 g of a powder comprising equal parts by weight of Steetley Ceramic Powders MCH45 amd MCH200. The resulting slurry was poured into the mould and allowed to set. When the slurry had hardened, after approximately 2 minutes, the carrier was removed from the mould, air-dried and fired at 1550° C.

Example IX

A crucible was prepared using magnesia supplied by Dynamit Nobel (U.K.) Limited. The quantities of components used were as follows 35 ml solution of magnesium acetate in zirconium acetate (composition as in Example VIII)
200 g magnesia mix comprising:
  2 parts by weight fused magnesia $-8+30$ mesh
  1 part by weight fused magnesia $-240$ mesh The resulting slurry was poured into the mould and allowed to set. After 3 minutes, the crucible was removed from the mould, air-dried and fired at 1550° C.

Example X

A crucible was prepared by mixing 25 ml solution of magnesium acetate in zirconium acetate (composition as in Example 13) with 200 g B40 refractory grain (A.P. Green Co., Mexico, Mo., U.S.A.). The resulting slurry was poured into a suitable mould which was being vibrated and allowed to set. After 2 minutes, the object was removed from the mould, then air-dried and fired at 1550° C. to give a crucible.

Example XI

Attempts to gel zirconium acetate solution with aqueous solutions of ethanolamine, diethanolamine and triethanolamine in the absence of a gel time controlling agent proved unsatisfactory, localised gellation being observed in all cases. If, however, a sufficient quantity of a gel time controlling agent magnesium acetate ($CH_3COO)_2Mg4H_2O$ is dissolved in the zirconium acetate solution it is possible to obtain good coherent gels which develop considerable strength on standing.

The following table gives results obtained using magnesium acetate.

Mg acetate / Zr acetate / organic base system

| % ethanolamine | % triethanolamine | % water | % 640P | % 740P | % ethylene glycol | Vol (ml) | Vol acetate solution (ml) | Tgel |
|---|---|---|---|---|---|---|---|---|
| 50 | — | — | 50 | — | — | 1.5 | 10 | localised gel |
| 30 | — | — | 70 | — | — | 2.5 | 10 | " |
| — | 70 | — | 30 | — | — | 3 | 10 | no gel |
| — | " | — | " | — | — | 4 | 10 | 2¼ mins |
| — | " | — | " | — | — | 5 | 10 | 1¼ mins |
| — | 50 | 50 | — | — | — | 3.5 | 10 | no gel |
| — | " | " | — | — | — | 4 | 10 | 3½ mins |
| — | " | " | — | — | — | 5 | 10 | 55 secs |
| — | 50 | — | 50 | — | — | 4 | 10 | no gel |
| — | " | — | " | — | — | 5 | 10 | 6 mins |
| — | " | — | " | — | — | 6 | 10 | 3¼ mins |
| — | 50 | — | — | 50 | — | 4 | 10 | 25 mins |
| — | " | — | — | " | — | 5 | 10 | 3¾ mins |
| — | " | — | — | " | — | 6 | 10 | 3 mins |
| — | 50 | — | — | — | 50 | 4 | 10 | no gel |
| — | " | — | — | — | " | 5 | 10 | 4 mins |
| — | " | — | — | — | " | 6 | 10 | 3 mins |

The above Results obtained using 10 g Mg acetate / 50 ml Zr acetate solution

| | | | | | | | | |
|---|---|---|---|---|---|---|---|---|
| — | 50 | 50 | — | — | — | 3.5 | 10 | no gel |
| — | " | " | — | — | — | 4 | 10 | 4½ mins |
| — | " | " | — | — | — | 5 | 10 | 1½ mins |

The above Results obtained using 15g Mg acetate / 50 ml Zr acetate solution

Results obtained using 20 g Mg acetate / 50 ml Zr acetate solution

| % ethanolamine | % diethanolamine | % triethanolamine | % water | % 640P | Vol accel. (ml) | Vol acetate solution (ml) | Tgel |
|---|---|---|---|---|---|---|---|
| 30 | — | — | — | 70 | 2 | 10 | no gel |
| " | — | — | — | " | 2.5 | 10 | 2½ mins |
| — | 50 | — | — | 50 | 2.5 | 10 | 11 mins |
| — | " | — | — | " | 3.0 | 10 | 2¾ mins |
| — | " | — | — | " | 3.5 | 10 | 2¼ mins |
| — | — | 50 | 50 | — | 3 | 10 | no gel |
| — | — | " | " | — | 4 | 10 | 8 mins |
| — | — | " | " | — | 5 | 10 | 2.5 mins |
| — | — | " | " | — | 6 | 10 | 1¼ mins |
| — | — | 50 | — | 50 | 4 | 10 | no gel |
| — | — | " | — | " | 5 | 10 | 36 mins |
| — | — | " | — | " | 6 | 10 | 30 mins |
| — | — | " | — | " | 7 | 10 | 30 mins |
| — | — | 50 | 25 | 25 | 4 | 10 | 45 mins |
| — | — | " | " | " | 5 | 10 | 12 mins |
| — | — | " | " | " | 6 | 10 | 10 mins |

These Results obtained using 25g Mg acetate / 50 ml Zr acetate solution

| % triethanolamine | % water | Volume accelerator (ml) | Volume acetate solution (ml) | Tgel |
|---|---|---|---|---|
| 50 | 50 | 4 | 10 | 21 mins |
| " | " | 5 | 10 | 6 mins |
| " | " | 6 | 10 | 4 mins |
| " | " | 7 | 10 | 4½ mins |

USE OF THE MAGNESIUM ACETATE/ZIRCONIUM ACETATE/ORGANIC BASE SYSTEM AS A REFRACTORY BINDER

Example XII

The above data suggest the possibility of using the magnesium acetate/zirconium acetate/organic base system to prepare refractory objects, based on a fine sillimanite mix, for example, and the above system. A slurry was prepared by mixing 200 g sillimanite mix with the necessary quantity of binder and the time required for the slurry to set was noted. (Tgel). Results obtained using 40 g magnesium acetate/100 ml zirconium acetate solution.

| Composition of accelerator | | | | | |
|---|---|---|---|---|---|
| % diethanolamine | % triethanolamine | % water | Vol. of accel. (ml) | Volume acetate solution (ml) | Tgel (mins) |
| 50 | — | 50 | 10 | 33 | 3 |
| 50 | — | 50 | 9 | 34 | 8 |
| 50 | — | 50 | 8 | 34 | 90 |
| — | 50 | 50 | 13 | 26 | 10 |
| — | 50 | 50 | 15 | 24 | 7 |

-continued

| | Composition of accelerator | | | | |
|---|---|---|---|---|---|
| % diethano-lamine | % triethano-lamine | % water | Vol. of accel. (ml) | Volume acetate solution (ml) | Tgel (mins) |
| — | 50 | 50 | 16 | 23 | 7 |
| — | 50 | 50 | 18 | 21 | 8 |

Results obtained using 20 g magnesium acetate/100 ml zirconium acetate solution

| Composition of accelerator | | | | |
|---|---|---|---|---|
| % triethano-lamine | % water | Volume accelerator (ml) | Volume acetate solution (ml) | Tgel |
| 50 | 50 | 11 | 28 | 10 mins |
| 50 | 50 | 12 | 27 | 2 mins |
| 50 | 50 | 13 | 26 | 2 mins |
| 50 | 50 | 16 | 23 | 1½ mins |

Results obtained using 10 g magnesium acetate/100 ml zirconium acetate solution

| Composition of accelerator | | | | |
|---|---|---|---|---|
| % triethanolamine | % water | Volume accelerator (ml) | Volume acetate solution (ml) | Tgel |
| 50 | 50 | 11 | 28 | slurry did not set |
| 50 | 50 | 13 | 26 | 1 min |

PREPARATION OF REFRACTORY OBJECTS BASED ON SINTERED MULLITE Example XIII

In each case, a slurry was obtained by mixing 200 g Sintered Mullite (preparation of this is described by Sargeant, Isherwood & Atthis, Refractories Jnl. June 1973, p.p. 12-18.) with the necessary amount of binder and the setting time of the slurry (Tgel) was noted)

Results obtained using 40 g Magnesium acetate (gel time controlling agent)/100 ml zirconium acetate solution.

| Composition of accelerator (gellation inducing agent) | | | | | |
|---|---|---|---|---|---|
| % ethano-lamine | % trietha-nolamine | % water | Vol. accel. (ml) | Vol. acetate solution (ml) | T gel |
| 30 | — | 70 | 7 | 30 | slurry did not set |
| 30 | — | 70 | 10 | 30 | 1 min. |
| 15 | — | 85 | 7 | 30 | slurry did not set |
| 15 | — | 85 | 9 | 30 | 30 secs. |
| — | 50 | 50 | 13 | 26 | 20 mins. |
| — | 50 | 50 | 20 | 20 | slurry did not set |

EFFECT OF AMMONIUM CHLORIDE (GEL TIME CONTROLLING AGENT) ON THE MAGNESIUM ACETATE (GEL TIME CONTOLLING AGENT)/ZIRCONIUM ACETATE/TRIETHANOLAMINE (GEL INDUCING AGENT) SYSTEM

Example XIV

Solutions of ammonium chloride in triethanolamine were used to gel zirconium acetate solution containing magnesium acetate.

| Composition of accelerator | | | | | |
|---|---|---|---|---|---|
| % trietha-nolamine | % water | % ammonium chloride | Volume accel-erator (ml) | Volume acetate solution (ml) | T gel |
| 50 | 50 | 10 | 6 | 10 | 7 mins |
| 50 | 50 | 10 | 8 | 10 | 7 mins |
| 50 | 50 | 10 | 10 | 10 | 11 mins |
| 50 | 50 | 5 | 5 | 10 | 6 mins |
| | | | 6 | 10 | 3¼ mins |
| | | | 8 | 10 | 3¼ mins |

Above results obtained with 40 g magnesium acetate/100 ml zirconium acetate solution.

The following examples illustrate systems which are practical on a commercial scale. The formulation Zetabond 10 referred to is proprietary to Zirconal Processes Limited and comprises 100 ml of zirconium acetate solution (ZrO$_2$ content 22% w/w) in which are dissolved 10 gm of magnesium acetate 4H$_2$O crystals.

USE OF ZIRCONIUM ACETATE SOLUTION FOR BINDING REFRACTORY POWDER

Example XV

Zetabond 10/640P industrial methylated spirits solution gelled by the addition of triethanolamine/triethanolamine hydrochloride solution.

(a) A cylinder was prepared by mixing 30 ml of a solution containing 60 mls zetabond 10 in 40 mls of 640P industrial methylated spirits (Zetabond 10/640P solution (60:40) with 9 ml triethanolamine hydrochlroide/triethanolamine solution obtained by dissolving 5 g triethanolamine hydrochloride in 100 ml of a 40% aqueous solution of triethanolamine, then adding 200 fine sillimanite mix. The resulting slurry developed strength quite slowly. The observed setting time was 12 mins. (Time to gel in the absence of powder was 2½ minutes.

(b) A cylinder was prepared by mixing 26 ml of a zetabond 10/640P solution (60:40) with 14 ml of triethanolamine hydrochloride/triethanolamine solution obtained by dissolving 10 g triethanolamine hydrochloride in 100 ml of a 40% aqueous solution of triethanolamine, then adding 200 g fine sillimanite mix. The slurry obtained became somewhat immobile after 3 mins. and a setting time of approximately 12 mins. was observed.

(c) A cylinder was prepared by mixing 26 ml of a zetabond 10/640P solution (80:20) with 14 ml of triethanolamine hydrochloride/triethanolamine solution obtained by dissolving 10 g triethanolamine hydrochloride in 100 ml of a 40% aqueous solution of triethanolamine, then adding 200 g fine sillimanite mix. The resulting slurry would not flow under vibration after 2 mins. The shaped object could be removed from the mould after 6 mins. but was still a little soft. (Tgel = 1 min.)

Example XVI

Zetabond 10/640P solution gelled by addition of tri(hydroxymethyl) methylamine ("tris") solution.

A cylinder was prepared by mixing 26 ml industrial methylated spirits zetabond 10/640P/solution (80:20) with 13 ml 50% aqueous solution of TM, then adding 200 g sillimanite mix. After 25 mins. The cylinder was firm enough to be stripped from the mould. (Tgel=5 mins.)

Example XVII

Fructose-magnesium chloride-zirconium acetate solution gelled by addition of morpholine solution A cylinder was prepared by mixing 27.5 ml of a solution obtained by dissolving 12 g fructose and 8 g magnesium chloride (hydrated) in 100 ml zirconium acetate solution with 16.5 ml 50% aqueous solution of morpholine, then adding 200 g sillimanite mix. Slurry flowed quite well under vibration. Cylinder could be stripped from the mould after 5 mins. (Tgel=2¼ mins.)

Example XVIII

Fructose-magnesium chloride (gel time controlling agents) zirconium acetate solution gelled by addition of diethanolamine solution A cylinder was prepared by mixing 26 ml of a solution obtained by dissolving 10 g fructose and 10 g magnesium chloride (hydrated) in 100 ml zirconium acetate solution with 13 ml 50% aqueous solution of diethanolamine, then adding 200 g sillimanite mix. The resulting slurry flowed satisfactorily under vibration. Cylinder was stripped from mould after 12 mins. (Tgel=2½ mins.)

Example XIX

Fructose (gel time controlling agent) zirconium acetate solution gelled by addition of morpholine (gellation inducing agent) solution A cylinder was prepared by mixing 25 ml solution of 15 g fructose in 100 ml zirconium acetate solution with 15 ml 50% aqueous morpholine solution, then adding 200 g sillimanite mix. Slurry had reasonable flow properties. Cylinder could be stripped from mould after 12 mins. (Tgel=3½ mins.)

Example XX

Fructose-magnesium chloride-zirconium acetate solution gelled by addition of ethanolamine solution A tile was prepared by mixing in the order
200 ml solution of 10 g fructose and 10 g magnesium chloride (hydrated) in 100 ml zirconium acetate solution
80 ml solution comprising equal volumes of 640P I.M.S. water and ethanolamine
1500 g sillimanite mix.

The slurry remained mobile for approximately 3 mins. Tile stripped satisfactorily at 40 mins. but was rather flexible.

Example XXI

Ammonium lactate (gel time controlling agent) zirconium acetate solution gelled by the addition of diethanolamine solution A cylinder was prepared by mixing 26 ml zirconium acetate ammonium lactate solution (80:20) with 13 ml 50% aqueous solution of diethanolamine, then adding 200 g of a fine sillimanite mix. Slurry remained mobile for approximately 7 mins. Article was stripped at 50 mins. although still a little soft.

Experiments with triethanolamine hydrochloride (gel time controlling agent)/triethanolamine solutions (a) Gellation of zirconium acetate solution TEA—Triethanolamine
TEA HCl—Triethanolamine Hydrochloride

| Composition of binder | | Composition of gelling agent | | Wt. TEA HCl (gm) | Volume binder (ml) | Volume gelling agent (ml) | Tgel |
|---|---|---|---|---|---|---|---|
| % by volume zirconium acetate solution | % by volume 640P | % by volume TEA | % by volume water | | | | |
| 100 | — | 50 | 50 | 5 | 10 | 3 | no gel |
| " | — | " | " | " | 10 | 4 | 50 secs |
| " | — | " | " | " | 10 | 6 | spontaneous gel |
| 100 | — | 30 | 70 | 5 | 10 | 5 | no gel |
| " | — | " | " | " | 10 | 6 | no gel |
| " | — | " | " | " | 10 | 7 | 50 secs |
| 100 | — | 40 | 60 | 5 | 10 | 4 | no gel |
| " | — | " | " | " | 10 | 5 | 60 secs |
| 100 | — | 30 | 70 | 2½ | 10 | 6 | no gel |
| " | — | " | " | " | 10 | 7 | 35 secs |
| 100 | — | 40 | 60 | 10 | 10 | 5 | >30 mins |
| " | — | " | " | " | 10 | 6 | 15 secs |
| 60 | 40 | 50 | 50 | 2½ | 10 | 4 | 35 secs |
| " | " | " | " | " | 10 | 5 | 35 secs |
| 60 | 40 | 50 | 50 | 5 | 10 | 5 | 45 secs |
| " | " | " | " | " | 10 | 6 | 65 secs |
| 60 | 40 | 40 | 60 | 10 | 10 | 4 | 20 secs |
| " | " | " | " | " | 10 | 5 | 15 secs |
| " | " | " | " | " | 10 | 6 | 15 secs |

Experiments with triethanolamine hydrochloride/triethanolamine solutions

(b) Gellation of zetabond 10

| Composition of binder | | Composition of gelling agent | | Wt. TEA HCl (gm) | Volume binder (ml) | Volume gelling agent (ml) | Tgel |
|---|---|---|---|---|---|---|---|
| % by volume zetabond 10 | % by volume 640P | % by volume TEA | % by volume water | | | | |
| 100 | — | 40 | 60 | 5 | 10 | 5 | 5 mins |
| " | — | " | " | " | 10 | 6 | 30 secs |
| 100 | — | 40 | 60 | 10 | 10 | 5 | 7 mins |
| " | — | " | " | " | 10 | 6 | 45 secs |
| 80 | 20 | 40 | 60 | 10 | 10 | 4 | 7 mins |
| " | " | " | " | " | 10 | 5 | 1¾ mins |
| " | " | " | " | " | 10 | 6 | 1 min |
| 60 | 40 | 40 | 60 | 5 | 10 | 3 | 2½ mins |
| " | " | " | " | " | 10 | 4 | 45 secs |
| " | " | " | " | " | 10 | 5 | 30 secs |
| 60 | 40 | 40 | 60 | 10 | 10 | 3 | >20 mins |
| " | " | " | " | " | 10 | 4 | 2¾ mins |
| " | " | " | " | " | 10 | 5 | 2 mins |
| 60 | 40 | 50 | 50 | 10 | 10 | 4 | 70 secs |
| " | " | " | " | " | 10 | 5 | 70 secs |

Note:
similar results cannot be obtained by dosing triethanolamine solution with conc. hydrochloric acid solution.

Experiments with ammonium lactate (gel time controlling agent) solution

(a) Gellation of zirconium acetate solution in ammonium lactate solutions

Results obtained using 20 g Mg Cl$_2$.6H$_2$O (gel time controlling agent)/100 ml zirconium acetate-ammonium lactate solution (90:10)

| Volume lactate solution (ml) | Volume 50% TEA solution (ml) | Volume 50% MEA solution (ml) | Volume accelerator (a) (ml) | T gel |
|---|---|---|---|---|
| 10 | — | 6 | — | 20 secs |
| 10 | — | — | 3 | 20 secs |
| 10 | — | — | 5 | 20 secs |

| % by volume Zr. acetate solution | % by volume ammonium lactate solution | Volume binder (ml) | Volume 50% TEA solution (ml) | Volume 50% DEA solution (ml) | Volume 50% MEA sol. (ml) | Vol. accelerator (a) (ml) | Vol. accelerator (b) (ml) | Tgel |
|---|---|---|---|---|---|---|---|---|
| 80 | 20 | 10 | 6 | — | — | — | — | ≈1 hr |
| " | " | 10 | 7 | — | — | — | — | |
| " | " | 10 | — | 6 | — | — | — | 6 min |
| " | " | 10 | — | 7 | — | — | — | >6 mins |
| " | " | 10 | — | 4 | — | — | — | 5 mins |
| " | " | 10 | — | 5 | — | — | — | 2¼ mins |
| " | " | 10 | — | — | 2 | — | — | no gel |
| " | " | 10 | — | — | 3 | — | — | 15 sec |
| " | " | 10 | — | — | 4 | — | — | 15 sec |
| " | " | 10 | — | — | — | 3 | — | >20 min |
| " | " | 10 | — | — | — | 3.5 | — | 4½ min |
| " | " | 10 | — | — | — | 4 | — | 1 min |
| 90 | 10 | 10 | 4 | — | — | — | — | no gel |
| " | " | 10 | 5 | — | — | — | — | 1½ min |
| " | " | 10 | 6 | — | — | — | — | 30 sec |
| 95 | 5 | 10 | 4 | — | — | — | — | localised gel |
| " | " | 10 | — | — | — | — | 4 | 1¼ min |
| " | " | 10 | — | — | — | — | 5 | 10 sec |

MEA - Monoethanolamine
DEA - Diethanolamine
TEA - Triethanolamine
The ammonium lactate used throughout is a 60% w/w solution.

-continued

| Volume lactate solution (ml) | Volume 50% TEA solution (ml) | Volume 50% MEA solution (ml) | Volume accelerator (a) (ml) | T gel |
|---|---|---|---|---|
| 10 | — | — | 6 | 25 secs |
| 10 | 6 | — | — | 50 secs |

Experiments with ammonium lactate solution (b) Gellation of zetabond 10 - ammonium lactate solutions

| % by volume zetabond 10 | % by volume ammonium lactate solution | Volume binder (ml) | Volume 50% TEA soln. (ml) | Volume 50% MEA soln. (ml) | Volume accelerator (a) (ml) | T gel |
|---|---|---|---|---|---|---|
| 90 | 10 | 10 | 5 | — | — | 7 min |
| 90 | " | 10 | 6 | — | — | 4 min |
| 90 | " | 10 | — | — | 3 | 1 min 20 sec |
| " | " | 10 | — | — | 4 | 30 sec |
| 80 | 20 | 10 | — | 4 | — | >20 min |
| " | " | 10 | — | 5 | — | >20 min |
| " | " | 10 | — | — | 4 | >20 min |
| " | " | 10 | — | — | 5 | >20 min |
| 85 | 15 | 10 | — | 5 | — | 3 min |
| " | " | 10 | — | — | 5 | 5 min |
| " | " | 10 | — | — | 6 | 8 min |

Accelerator (a)—solution comprising equal volumes of 640P, MEA and water.
Accelerator (b)—solution comprising 2 volumes TEA, 1 volume 640P, 1 volume water.

Experiments with betaine (gel time controlling agent-compound which in solution provides a dipolar (Zwitter) ion Results obtained using 10 g betaine/100 ml zirconium acetate solution

| Volume betaine solution (ml) | Volume 50% TEA solution (ml) | Tgel |
|---|---|---|
| 10 | 4 | 1¾ min |
| 10 | 5 | 20 sec |

Results obtained using 10 g betaine/100 ml zetabond 10—Solution A

| % by volume solution A | % by volume solution 640P I.M.S. | Volume binder (ml) | Volume 50% TEA solution (ml) | Tgel | |
|---|---|---|---|---|---|
| 100 | — | 10 | 4 | 1¼ min | |
| 100 | — | 10 | 5 | 30 sec | |
| 50 | 50 | 10 | 2 | 25 min | gels a little soft |
| " | " | 10 | 3 | 2½ min | |
| " | " | 10 | 4 | 2½ min | |

Results obtained using 20 g betaine/100 ml Zetabond 10—Solution B

| % by volume solution B | % by volume 640P I.M.S. | Volume binder (ml) | Volume 50% TEA solution (ml) | T gel | |
|---|---|---|---|---|---|
| 100 | — | 10 | 3 | >30 mins | |
| " | — | 10 | 4 | 2½ mins | |
| " | — | 10 | 5 | 1¼ mins | |
| 50 | 50 | 10 | 3 | 9 mins | slow development of gel strength |
| " | " | 10 | 4 | 20 mins | |
| " | " | 10 | 5 | 35 mins | |
| 70 | 30 | 10 | 3 | 16 mins | development of strength very slow |
| " | " | 10 | 4 | 9 mins | |
| " | " | 10 | 5 | 4 mins | |
| 85 | 15 | 10 | 3 | 5 mins | gels developed strength very slowly |
| " | " | 10 | 4 | 2½ mins | |
| " | " | 10 | 5 | 3 mins | |

Experiments with fructose (gel time controlling agent)

(a) Gellation of fructose-zirconium acetate solutions

Results obtained using 15 g fructose/100 ml zirconium acetate solution:

| Volume fructose solution (ml) | Volume 50% TEA solution (ml) | Volume 50% MEA solution (ml) | Volume 50% morpholine solution (ml) | Volume 50% DEA solution (ml) | T gel |
|---|---|---|---|---|---|
| 10 | — | 3 | — | — | 2 mins |
| 10 | — | 4 | — | — | 5¼ mins |
| 10 | — | 6 | — | — | 1½ mins |
| 10 | — | — | 4 | — | 8½ mins |
| 10 | — | — | 5 | — | 5 mins |
| 10 | — | — | 6 | — | 3½ mins |

Results obtained using 10 g fructose/100 ml zirconium acetate solution:

| Volume fructose solution (ml) | Volume 50% TEA solution (ml) | Volume 50% MEA solution (ml) | Volume 50% morpholine solution (ml) | Volume 50% DEA solution (ml) | T gel |
|---|---|---|---|---|---|
| 10 | — | 5 | — | — | immediate gellation |
| 10 | — | — | 5 | — | immediate gellation |
| 10 | 5 | — | — | — | 3¼ mins |
| 10 | — | — | — | 4 | 1 min 20 sec |
| 10 | — | — | — | 5 | 1½ mins |

(b) Gellation of fructose-zetabond 10 solution

Results obtained using 10 g fructose/100 ml zetabond 10

| Volume fructose solution (ml) | Volume 50% MEA solution (ml) | Volume 50% morpholine solution (ml) | T gel |
|---|---|---|---|
| 10 | 5 | — | 2 mins |
| 10 | — | 5 | 6¼ mins |
| 10 | — | 6 | 3 mins |

(c) Gellation of fructose-zetabond 5 solution

Results obtained using 10 g fructose/100 ml zetabond 5:

| Volume fructose solution (ml) | Volume 50% TEA solution | Volume 50% morpholine solution | T gel |
|---|---|---|---|
| 10 | 5 | — | 25 secs |
| 10 | — | 5 | localised gellation |

(d) Gellation of fructose-magnesium chloride-zirconium acetate solutions

Results obtained using 15 g fructose and 20 g magnesium chloride (hydrated)/100 ml zirconium acetate solution:

| Volume fructose solution (ml) | Volume 50% TEA solution (ml) | Volume 50% morpholine solution (ml) | T gel |
|---|---|---|---|
| 10 | — | 5 | gellation did not occur |
| 10 | — | 6 | gellation did not occur |
| 10 | 5 | — | gellation did not occur |
| 10 | 6 | — | gellation did not occur |

Results obtained using 15 g fructose and 10 g magnesium chloride (hydrated)/100 ml zirconium solution:

| Volume fructose solution (ml) | Volume 50% MEA solution (ml) | Volume 50% morpholine solution (ml) | T gel |
|---|---|---|---|
| 10 | 6 | — | gellation did not occur |
| 10 | — | 6 | gellation did not occur |

Results obtained using 15 g fructose and 5 g magnesium chloride (hydrated)/100 ml zirconium acetate solution:

| Volume fructose solution (ml) | Volume 50% MEA solution (ml) | Volume 50% morpholine solution (ml) | T gel |
|---|---|---|---|
| 10 | 6 | — | 5 mins |
| 10 | — | 6 | 6¼ mins |

Results obtained using 12 g fructose and 8 g magnesium chloride (hydrated)/100 ml zirconium acetate solution:

| Volume fructose solution (ml) | Volume 50% MEA solution (ml) | Volume 50% morpholine solution (ml) | Volume 50% DEA solution (ml) | T gel |
|---|---|---|---|---|
| 10 | 5 | — | — | 1½ mins |
| 10 | 6 | — | — | 2 mins 15 secs |
| 10 | — | 4 | — | 6 mins |
| 10 | — | 5 | — | 3 mins 20 secs |
| 10 | — | 6 | — | 2 mins 15 secs |
| 10 | — | — | 6 | 25 mins |

Results obtained using 10 g fructose and 10 g magnesium chloride (hydrated)/100 ml zirconium acetate solution:

| Volume fructose solution (ml) | Volume 50% MEA solution (ml) | Volume 50% morpholine solution (ml) | Volume 50% DEA solution (ml) | T gel |
|---|---|---|---|---|
| 10 | 4 | — | — | 25 secs |
| 10 | 5 | — | — | 30 secs |
| 10 | 6 | — | — | 30 secs |
| 10 | — | 5 | — | localised gellation |
| 10 | — | — | 5 | 2½ mins |
| 10 | — | — | 6 | 3¾ mins |

Results obtained using 10 g fructose and 5 g magnesium chloride (hydrated)/100 ml zirconium acetate solution:

| Volume fructose solution (ml) | Volume 50% MEA solution (ml) | Volume gelling agent (a) (ml) | T gel |
|---|---|---|---|
| 10 | 3 | — | 45 secs |
| 10 | 6 | — | 1 min. 15 secs |
| 10 | — | 6 | 3 mins 15 secs |

Gelling agent (a)—solution comprising equal volumes of MEA, 640P and water

Results obtained using 10 g fructose and 4 g magnesium chloride (hydrated)/100 ml zirconium acetate solution:

| Volume fructose solution (ml) | Volume gelling agent (a) (ml) | T gel |
|---|---|---|
| 10 | 5 | 1 min. 20 secs |
| 10 | 6 | 1 min. |

Experiments with Sorbitol (a) Gellation of sorbitol (gell time controlling agent)—zirconium acetate solutions Results obtained are given overleaf:

| Weight sorbitol (gms) dissolved in 100 ml zirconium acetate solution | Volume sorbitol solution (ml) | Volume 50% TEA solution (ml) | T gel |
|---|---|---|---|
| 5 | 10 | 5 | 1 min |
| " | 10 | 6 | 25 secs |
| 7 | 10 | 4 | >30 mins |
| " | 10 | 5 | 1 min 45 secs |
| " | 10 | 6 | 1 min 45 secs |
| " | 10 | 5 | 34 mins |
| 10 | 10 | 6 | 13 mins |
| " | 10 | 7 | 12 mins |
| 20 | 10 | 5 | gellation did not occur |
| " | 10 | 6 | |
| " | 10 | 7 | |

(b) Gellation of sorbitol-zetabond 10 solutions

Results obtained using 7 g sorbitol/100 ml zetabond 10:

| Composition of gelling agent | | | | Volume sorbitol solution (ml) | Volume gelling agent (ml) | T gel |
|---|---|---|---|---|---|---|
| % by volume TEA | % by volume MEA | % by volume water | % by volume 640P | | | |
| 50 | — | 50 | — | 10 | 5 | >1 hr |
| " | — | " | — | 10 | 6 | >1 hr |
| — | 50 | — | 50 | 10 | 5 | >1 hr |
| — | " | — | " | 10 | 6 | >1 hr |

Results obtained using 5 g sorbitol/100 ml zetabond 10:

| Composition of gelling agent | | | | Volume sorbitol solution (ml) | Volume gelling agent (ml) | T gel |
|---|---|---|---|---|---|---|
| % by volume TEA | % by volume MEA | % by volume water | % by volume 640P | | | |
| 50 | — | 50 | — | 10 | 5 | No gel |
| " | — | " | — | 10 | 6 | 15 mins |
| — | 50 | — | 50 | 10 | 6 | 2½ mins |
| — | " | — | " | 10 | 7 | 50 secs |
| — | 35 | 15 | 50 | 10 | 3 | No gel |
| — | " | " | " | 10 | 4 | 75 secs |
| — | " | " | " | 10 | 5 | 30 secs |

Results obtained using 2 g sorbitol/100 ml zetabond 10:

| Composition of binder | | Composition of gelling agent | | | | Volume sorbitol solution (ml) | Vol. gel. agent (ml) | T gel |
|---|---|---|---|---|---|---|---|---|
| % by volume sorbitol solution | % by volume 640P | % by vol. TEA | % by vol. MEA | % by vol. water | % by vol. 640P | | | |
| 100 | — | 50 | — | 50 | — | 10 | 4 | 7 mins |
| " | — | " | — | " | — | 10 | 5 | 45 secs |
| 80 | 20 | 50 | — | 50 | — | 10 | 4 | 2 mins |
| " | " | " | — | " | — | 10 | 5 | 1 min |
| " | " | — | 35 | 15 | 50 | 10 | 3 | 10 secs |
| " | " | — | " | " | " | 10 | 4 | spontaneous gellation. |

(c) Gellation of sorbitol-magnesium chloride-zirconium acetate solutions

Results obtained using 10 g sorbitol analog magnesium chloride (hydrated)/100 ml zirconium acetate solution:

hz,1/32

| Volume sorbitol soluton (ml) | Volume 50% TEA solution (ml) | Volume gelling agent (a) (ml) | T gel |
|---|---|---|---|
| 10 | 5 | — | 40 secs |
| 10 | 6 | — | 50 secs |
| 10 | — | 5 | 3¼ mins |
| 10 | — | 6 | 2 mins |

Results obtained using 5 g sorbitol and 10 g magnesium chloride (hydrated)/100 ml zirconium acetate solution:

| Volume sorbitol solution (ml) | Volume 50% TEA solution (ml) | Volume gelling agent (a) (ml) | T gel |
|---|---|---|---|
| 10 | 6 | — | 20 secs |
| 10 | — | 6 | localised gellation |

Experiments with Glycine (compound which in solution provides dipolar (Zwitter) ions-gellation time controlling agent)

(a) Gellation of glycine-zirconium acetate solutions.

Results are given overleaf:

| Composition of binder | | | | | | Volume gelling agent (a) (ml) | T gel |
|---|---|---|---|---|---|---|---|
| Weight glycine (gms)/100 ml zirconium acetate solution | % by volume glycine solution | % by volume 64OP | Volume binder (ml) | Volume 50% TEA solution (ml) | Volume 50% MEA solution (ml) | | |
| 15 | 100 | — | 10 | — | 3 | — | 40 secs |
| " | " | — | 10 | — | 4 | — | 15 secs |
| " | " | — | 10 | — | 6 | — | 15 secs |
| " | " | — | 10 | — | — | 4 | 1 min |
| " | " | — | 10 | — | — | 6 | 25 secs |
| 10 | " | — | 10 | 4 | — | — | no gel |
| " | " | — | 10 | 5 | — | — | 28 mins |
| " | " | — | 10 | 6 | — | — | 3 mins |
| 5 | " | — | 10 | 5 | — | — | 2½ mins |
| " | " | — | 10 | 6 | — | — | 50 secs |
| 1 | " | — | 10 | 5 | — | — | 20 secs |
| 10 | 80 | 20 | 10 | 5 | — | — | 15 mins |
| " | " | " | 10 | 6 | — | — | 20 mins |
| 5 | " | " | 10 | 5 | — | — | 2½ mins |
| " | " | " | 10 | 6 | — | — | 70 secs |
| 1 | 60 | 40 | 10 | 5 | — | — | 20 secs |

(b) Gellation of glycine-zetabond 5 solution

Results obtained using 2½ g glycine/100 ml zetabond 5:

| Volume glycine solution (ml) | Volume 50% TEA solution (ml) | T gel |
|---|---|---|
| 10 | 4 | 8 mins |
| 10 | 5 | 50 secs |

Experiments with Glycerol (a) Gellation of glycerol (gellation time controlling agent)—zirconium acetate solution Results obtained are given below:

| Composition of binder | | | | |
|---|---|---|---|---|
| % by volume zirconium acetate solution | % by volume glycerol | volume binder (ml) | volume gelling agent(b) (ml) | T gel |
| 80 | 20 | 10 | 4 | 30 secs |
| " | " | 10 | 6 | 35 secs |

(b) Gellation of glycerol-zetabond 10 solutions

Following results were obtained:

(c) Gellation of glycerol-magnesium chloride-zirconium acetate solutions

Results obtained using 17 g magnesium chloride hydrated/100 ml zirconium acetate solution-glycerol solution (80:20)

| Volume glycerol solution (ml) | Volume gelling agent (b) (ml) | Volume 50% TEA solution (ml) | T gel |
|---|---|---|---|
| 10 | 6 | — | 4 mins |
| 10 | — | 5 | 1¼ mins |
| 10 | — | 6 | 1½ mins |

Gelling agent (b)—solution comprising 2 parts by volume TEA, 1 part of 640P and 1 part of water.

Experiments with Amino-alcohols other than the Ethanolamines as Gellation Inducing Agents (a) Gellation of zetabond 10

Results obtained are given below:

| Composition of binder | | | | | | | |
|---|---|---|---|---|---|---|---|
| % by volume zetabond 10 | % by volume 640P | Volume binder (ml) | Volume 50% solution TM (ml) | Volume 50% solution 2-amino 2-methyl-1:3 propanediol (ml) | Volume 50% solution AMP (ml) | Volume 50% solution 2-amino-2 ethyl-1:3 propanediol (ml) | T gel |
| 100 | — | 10 | 4 | — | — | — | No gel |
| " | — | 10 | 5 | — | — | — | 7 mins |
| 90 | 10 | 10 | 5 | — | — | — | 4 mins |
| 80 | 20 | 10 | 3 | — | — | — | no gel |
| " | " | 10 | 4 | — | — | — | 7 mins |
| " | " | 10 | 5 | — | — | — | 5 mins |
| 70 | 30 | 10 | 5 | — | — | — | 8 mins |
| " | " | 10 | 6 | — | — | — | 13 mins |
| 100 | — | 10 | — | 5 | — | — | no gel |
| " | " | 10 | — | 6 | — | — | 20 secs |
| 80 | 20 | 10 | — | 5 | — | — | 40 secs |
| 100 | — | 10 | — | — | 5 | — | localised gellation |
| " | — | 10 | — | — | — | 6 | 45 secs |

| Composition of binder | | | | | |
|---|---|---|---|---|---|
| % by volume zetabond 10 | % by volume glycerol | Volume binder (ml) | Volume gelling agent (b) (ml) | Volume 50% TEA solution (ml) | T gel |
| 90 | 10 | 10 | 6 | — | 2 mins |
| 80 | 20 | 10 | 5 | — | 4 mins |
| " | " | 10 | 6 | — | 5 mins |
| " | " | 10 | — | 5 | 2 mins |
| " | " | 10 | — | 6 | 3 mins |

(b) Gellation of zetabond 30

Following results obtained:

| Composition of binder | | | | |
|---|---|---|---|---|
| % by volume zetabond 30 | % by volume 640P | Volume binder (ml) | Volume 50% solution TM (ml) | T gel |
| 100 | — | 10 | 6 | 8 mins |

-continued

| Composition of binder | | | | |
|---|---|---|---|---|
| % by volume zetabond 30 | % by volume 640P | Volume binder (ml) | Volume 50% solution TM (ml) | T gel |
| 80 | 20 | 10 | 5 | 18 mins |
| " | " | 10 | 6 | 30 mins |

Note:
AMP - 2-amino-2-methyl 1 propanol
TM - Tri(hydroxymethyl)methylamine

(c) Gellation of magnesium lactate-zirconium acetate solution

Results obtained using 10 g magnesium lactate/100 ml zirconium acetate solution.

| Volume lactate solution (ml) | Volume 50% TM solution (ml) | Volume 50% AMP solution (ml) | T gel |
|---|---|---|---|
| 10 | 6 | — | 15 mins |
| 10 | 7 | — | 12 mins |
| 10 | 8 | — | 10 mins |
| 10 | — | 5 | localised gellation |

Results obtained using 5 g magnesium lactate/100 ml acetate solution:

| Volume lactate solution (ml) | Volume 50% TM solution (ml) | T gel |
|---|---|---|
| 10 | 5 | No gel |
| 10 | 6 | 2 mins 45 secs |
| 10 | 7 | 1 min 45 secs |

Results obtained using 2½ g magnesium lactate/100 ml zirconium acetate solution:

| Volume lactate solution (ml) | Volume 50% TM solution (ml) | T gel |
|---|---|---|
| 10 | 5 | 2 mins. |

Experiments with Mannitol (a) Gellation of mannitol-magnesium chloride-zirconium acetate solution Results obtained using 10 g mannitol and 10 g magnesium chloride (hydrated)/100 ml zirconium acetate solution:

| Volume mannitol solution (ml) | Volume gelling agent (b) | T gel |
|---|---|---|
| 10 | 3 | No gel |
| 10 | 4 | 2 mins |
| 10 | 6 | 20 secs |

Gelling agent (b)—solution comprising 2 parts by volume TEA, 1 part of water and 1 part of 640P.

Gellation of Solution of Magnesium Lactate in Zirconium Acetate Solution

| Weight of magnesium lactate (gm) 100ml Zr acetate | Composition of gelling agent | | | | Volume lactate solution (ml) | Volume gelling agent (ml) | T gel | |
|---|---|---|---|---|---|---|---|---|
| | % by volume TEA | % by volume DEA | % by volume water | % by volume 640P | | | | |
| 4 | 50 | — | 50 | — | 10 | 4 | 1 hr. | |
| " | " | — | " | — | 10 | 5 | 30 secs. | |
| 10 | " | — | " | — | 10 | 5 | 8 mins. | firm gels on standing |
| " | " | — | " | — | 10 | 6 | 4 mins. | |
| " | " | — | " | — | 10 | 7 | 3 mins. | |
| " | — | 50 | 50 | — | 10 | 3 | >70 mins. | |
| " | — | " | " | — | 10 | 4 | 75 secs. | |
| " | — | 50 | — | 50 | 10 | 4 | 2½ mins. | firm gels on standing |
| " | — | " | — | " | 10 | 5 | 3 mins. | |
| " | — | " | — | " | 10 | 6 | 10 mins. | |

Example XXII

Experiments with Steetley's ceramic powder—MCH grade and the refractory binder based on zirconium acetate solution Steetley ceramic powder is a spinel based refractory powder having the approximate composition given in Example VII. It thus contains its own gel inducing agent.

Bonding to a refractory aggregate consisting of 2 parts by weight of Steetley ceramic powder MCH 45 and 1 part by weight of Steetley ceramic powder MCH 200 was attempted using zirconium acetate solution (22% $ZrO_2$) in which a suitable additive had been dissolved. Data showing the effect of various additives on gellation behaviour are given below. For the preparation of shaped refractory objects, the refractory aggregate and binder medium were used in the proportion of 100 g refractory aggregate to 20 ml binder medium.

(a) Effect of magnesium acetate crystals $(CH_3COO)_2Mg \cdot 4H_2O$ (See Example VII)

| Weight of magnesium acetate crystals (gms) dissolved in 100ml of zirconium acetate solution | Setting time of slurry (min) | Comments |
|---|---|---|
| 0 | 2½ | |
| 10 | 3¾ | rapid development of strength |
| 20 | 4¾ | |
| 30 | 6¼ | |
| 40 | 11 | |

(b) Effect of magnesium acetate (dried) $(CH_3COO)_2Mg\ H_2O$

| Weight of magnesium acetate (gms) dissolved in 100ml zirconium acetate solution | Setting time of slurry (min) | Comments |
|---|---|---|
| 0 | 2½ | good development of strength |
| 10 | 4¼ | |
| 20 | 7 | |
| 30 | 45 | did not harden completely |

(c) Effect of magnesium Lactate

| Weight of magnesium lactate (gms) dissolved in 100ml zirconium acetate solution | Volume lactate solution (ml) | Volume glycerol (ml) | Volume ethylene glycol (ml) | Volume 7402 (ml) | Setting time | |
|---|---|---|---|---|---|---|
| 0 | 20 | — | — | — | 2½min. | rapid development of strength |
| 4 | 20 | — | — | — | 4min. | |
| 10 | 20 | — | — | — | 5min. | |
| 4 | 17.5 | 2.5 | — | — | 10min. | |
| " | 15 | 5 | — | — | slurry thickened but did not harden | |
| " | 15 | — | 5 | — | 4min. | rapid development of strength |
| " | 15 | — | — | 5 | 4min. | |

(d) Effect of sorbitol

| Weight sorbitol (gm) dissolved in 100ml zirconium acetate solution | Setting time of slurry (mins.) | Comments |
|---|---|---|
| 0 | 2½ | |
| 10 | 12 | fairly rapid increase in viscosity initially development of strength somewhat slow |
| 11 | 17 | |
| 12 | 30 | |

-continued

| Weight sorbitol (gm) dissolved in 100ml zirconium acetate solution | Setting time of slurry (mins.) | Comments |
|---|---|---|
| 15 | | slurry immobile after 25 mins, still soft after 40 mins, slurry thickened but still rather soft after several hours |
| 20 | | |

(e) Effect of mannitol

| Weight of mannitol (gm) dissolved in 100ml zirconium acetate solution | Setting time of slurry |
|---|---|
| 0 | 2½ mins. |
| 5 | 4½ mins. |

(f) Effect of fructose

| Weight of fractone (gm) dissolved in 100ml zirconium acetate solution | Setting time of slurry | Comments |
|---|---|---|
| 0 | 2½ mins. | |
| 5 | 4 mins. | developed strength on standing |
| 10 | 13 mins. | |
| 15 | Immobile after 35 mins., did not harden slurry | |
| 20 | became viscous but did not harden | |

Note:
magnesium citrate and magnesium oxalate are insoluble in zirconium acetate solution.

(g) Effect of diluents

In this case 15 ml binder medium used with 100 g refractory aggregate

| Volume zirconium acetate solution (ml) | Volume water (ml) | Volume 740P I.M.S. (ml) | Volume ethylene glycol (ml) | Volume glycerol (ml) | Setting time (mins.) | |
|---|---|---|---|---|---|---|
| 10 | 5 | — | — | — | 1¼ | very good green strength |
| 7.5 | 7.5 | — | — | — | 1¼ | |
| 5 | 10 | — | — | — | 50secs. | |
| 10 | — | 5 | — | — | 2¼ | |
| 7.5 | — | 7.5 | — | — | 2¼ | |
| 5 | — | 10 | — | — | 2¼ | |

-continued

| Volume zirconium acetate solution (ml) | Volume water (ml) | Volume 740P I.M.S. (ml) | Volume ethylene glycol (ml) | Volume glycerol (ml) | Setting time (mins.) |
|---|---|---|---|---|---|
| 10 | — | — | 5 | — | 2¼ |
| 7.5 | — | — | 7.5 | — | slurry did not harden |
| 12.5 | — | — | — | 2.5 | 2¼ |
| 10 | — | — | — | 5.0 | slurry did not harden |

Example XXIII

Use of alkali metal borates to control setting time of slurry of zetabond 10 and Steetley ceramic powder The tetraborates of lithium, potassium and sodium display strong retarding effects on the rate of setting of slurries of zetabond 10 and refractory powders of the MCH type. Of the tetraborates used, the sodium salt (borax) proved to be most satisfactory on account of its ready solubility in zetabond 10.

Experiments with sodium tetraborate (borax)

The appropriate quantity of borax was dissolved in a solution comprising equal volumes of zetabond 10 and 640P. A slurry was obtained by mixing 30 ml. binding medium with 200 g refractory aggregate. (The latter consisted of 2 parts by weight MCH 7+22, 1 part by weight MCH 85 and 2 parts by weight MCH 200) The slurry was poured into a cylinder mould and the setting time noted (see below). After hardening, the shaped article was removed from the mould, ignited to burn off the alcohol and then fired at 100° C. for four hours.

| Weight borax (gms) dissolved in 100ml of zetabond 10/640P solution (1:1) | Setting time of slurry |
|---|---|
| 0 | 70 secs. |
| ½ | 2¾ mins. |
| 1¼ | 3¼ mins. |
| 2½ | 5 mins. |
| 5.0 | 8 mins. |
| 15 | 15 mins. |

With zirconium acetate solution containing no magnesium acetate, much lower setting times are obtained as indicated in the following table.

| Weight borax (gms) dissolved in 100ml of acetate solution/ 640P (1:1) | Setting time of slurry |
|---|---|
| 0 | 40 secs. |
| 2½ | 2¼ mins. |
| 5 | 3¼ mins. |
| 7½ | 5¼ mins. |

Experiments with lithium tetraborate

Using lithium tetraborate in place of borax and following the procedure adapted previously, the following data were obtained.

| Weight of lithium tetraborate (gms) dissolved in 100ml of zetabond 10/640P solution (1:1) | Setting time of slurry |
|---|---|
| 0 | 70 secs. |
| ½ | 3¼ mins. |
| 1¼ | 4¼ mins. |
| 2½ | 8 mins. |

Experiments with potassium tetraborate

Potassium tetraborate has only limited solubility in zetabond 10 ($\simeq$1 g 1100 ml solution) and is, therefore, unsatisfactory. Using 1 g potassium tetraborate/100 ml zetabond 10/640P solution (1:1)—setting time of slurry 2¾ mins.

As alternatives to magnesium acetate, magnesium chloride (anhydrous), ammonium magnesium chloride and calcium formate were selected but were shown, under a wide range of conditions, to be ineffective in preventing localised gelation.

Example XXIV

Experiments with B40 basic refractory aggregate and the refractory binder based on zirconium acetate solution Slurries were prepared by mixing 25 ml binder medium (zirconium acetate containing gellation controller) with 200 g refractory aggregate and the setting time of the slurry was noted.

(1) Effect of magnesium acetate crystals $(CH_3COO)_2Mg4H_2O$

| Weight of magnesium acetate(gms) dissolved in zirconium acetate Solution | Volume acetate solution (ml) | Volume glycerol (ml) | Volume ethylene glycol (ml) | Setting time |
|---|---|---|---|---|
| 0 | 25 | — | — | 70 secs. |
| 20 | " | — | — | 2¼ mins. quite hard |
| 30 | " | — | — | 3 mins. |
| 40 | " | — | — | 6 mins. somewhat soft |

-continued

| Weight of magnesium acetate(gms) dissolved in zirconium acetate Solution | Volume acetate solution (ml) | Volume glycerol (ml) | Volume ethylene glycol (ml) | Setting time |
|---|---|---|---|---|
| 10 | 20 | 5 | — | slurry did not harden |
| " | 22.5 | 2.5 | — | slurry did not harden |
| " | 20 | — | 5 | 2 mins. |
| " | 25 | — | 10 | slurry thickened after 3 mins. but did not harden completely |

(2) Effect of magnesium acetate (dried) $(CH_3COO)_2MgH_2O$

| Weight of magnesium acetate (gms) dissolved in zirconium acetate solution | Setting time |
|---|---|
| 0 | 70 secs. |
| 5 | 1½ mins. |
| 10 | 2 mins. |
| 20 | 3½ mins. |

Example XXV

Preparation of monolithic ceramic shell moulds

A coating composition was prepared by dispersing 1000 g of Molochite-120 grade in 400 ml of a solution of magnesium acetate in zirconium acetate solution. A ceramic shell mould was prepared as follows:

Stage 1

A wax pattern was dipped into the coating composition, then dusted with a powder comprising a mixture of Steetley Ceramic Powder MCH 200-1 part by weight and, Steetley Ceramic Powder MCH-8+22-3 parts by weight. The coating on the pattern was allowed to harden by standing for ten minutes in air.

Stages 2, 3 and 4

As Stage 1. The shell was left overnight for hardening to be completed. A firm hard shell was obtained, with good resistance to removal of particles by mechanical abrasion. The shell may be dewaxed and fired following standard known procedures.

An alternative powder for dusting is a mixture of Steetley Ceramic Powder MCH200-1 part by weight, Steetley Ceramic Powder MCH45-3 parts by weight.

It is frequently advantageous to apply a sealing coat to the shell by dipping it into the coating composition before it is left overnight for hardening to be completed. If desired, a known primary coating may be applied to the wax pattern prior to the first stage of the ceramic shell mould formation.

Example XXVI

Effect of alcohol as diluent of solution of magnesium acetate in zirconium acetate solution used to bind Steetley Ceramic Powder The solution of magnesium acetate in zirconium acetate solution was prepared by dissolving 10.0 g of magnesium acetate crystals ($4H_2O$) in 100 ml of the zirconium acetate solution. The aggregate used was
Steetley Ceramic Powder MCH 45—4 parts by weight
Steetley Ceramic Powder MCH 200—4 parts by weight
Steetley Ceramic Powder MCH-8+25—1 part by weight 200 g of the above aggregate were used with 35 ml of the binder solution to form a slurry. The slurry was poured into a cylinder mould, 2 inches diameter, then allowed to set. After setting, the cylinder was removed from the mould, ignited to burn off the alcohol and remove water, then fired at 1450° C. for four hours. The cold crushing strength of the cylinder was determined after firing. Results obtained are given in the table.

Binder Composition

| % by volume zirconium acetate - magnesium acetate solution | % by volume 640P I.M.S. | crushing strength (lbs/in$^2$) after firing at 1450° C. for four hours |
|---|---|---|
| 100 | NTL | 710 |
| 75 | 25 | 540 |
| 50 | 50 | 300 |

The binder compositions 75:25 and 50:50 zirconiumacetate-magnesium acetate solution and 640P I.M.S. respectively may be used in conjunction with the aggregate to prepare moulds, part-moulds or cores for the casting of metals by a process in which the powdered refractory aggregate is mixed with the binder composition to form a pourable slurry and including the steps of igniting the solvent alcohol escaping from the surface of the mould as soon as the slurry is set by-gelling, the mould being supported during the burning of the alcohol in such a way that there is free circulation around all surfaces of the mould so that ignition and burning of the alcohol occurs evenly from all surfaces. This type of process is described in British Pat. No. 716,394.

Example XXVII

Use of dead burned magnesia as gelling agent with solution of magnesium acetate in zirconium acetate solution The dead burned magnesia used in this and the ensuing Examples is prepared by ball-milling a dead-burned Sardinium magnesia pellet. The analysis of the material used was
$Fe_2O_3$—0.22%
$Al_2O_3$—0.25%
CaO—1.62%
$SiO_2$—0.78%
BET surface area 2 m$^2$/g (approx.)
Surface area by Rigden method 0.25-0.30 m$^2$/g
Solutions of magnesium acetate in zirconium acetate solution were prepared by dissolving the appropriate amount of magnesium acetate crystals ($4H_2O$) in zirconium acetate solution.

Experiments with fine sillimanite mix

10% by weight of dead burned magnesia was added to the fine sillimanite mix. The results obtained are given in the table.

| Weight of refractory powder (gms) | Weight of magnesium acetate crystals (gms) per 100 ml zirconium acetate solution | Volume of solution used (ml) | Gel time (mins) | Observations |
| --- | --- | --- | --- | --- |
| 200 | 10 | 35 | 3½ | slow uniform set, very hard |
| 200 | 10 | 35 | 3 | volume of solution used contained v/v 740P I.M.S. Easier to pour. Set very hard |
| 200 | 40 | 35 | 5 | Thick syrupy slurry which hardened slowly |
| 1500 | 40 | 300 | 4 | volume of solution used contained 20 v/v 740P I.M.S. Slow to harden |

Example XXVIII

The molochite mix used was
Molochite ¼ on 8 grade—1 part by weight
Molochite 8–16 grade—1 part by weight
Molochite 16–30 grade—1 part by weight
Molochite −120 grade—2 parts by weight
5% by weight of DSP2 "fines" magnesia was added to the above mix. The binding liquid used was a mixture of one part by volume of 640P I.M.S. and two parts by volume of a solution of 10.0 g magnesium acetate crystals in 100 ml of zirconium acetate solution. 75 ml of this binding liquid per pound of refractory powder mix gave a slurry which had a setting time of five minutes. The "green strength" was very good. A suitable firing schedule is 1480° C. for 1½ hours.

Example XXIX

Experiments with silicon carbide mix

The silicon carbide mix used was
Sika silicon carbide 8–14 grade—2 parts by weight
Sika silicon carbide 14–36 grade—2 parts by weight
Sika silicon carbide 36–100 grade—1 part by weight
Carborundum silicon carbide 2F grade—2 parts by weight
5% by weight of DSP2 "fines" magnesia was added to the above mix. The binding liquid used was a mixture of one part by volume of 640P I.M.S. and three parts by volume of a solution of 10.0 g magnesium acetate crystals in 100 ml of zirconium acetate solution. 65 ml of this binding liquid per pound of refractory powder mix gave a slurry which had a setting time of about five minutes. The "green strength" was very good. A suitable firing schedule is 1550°–1600° C., gradually increasing over a period of three hours.

Example XXX

Manufacture of well blocks for the discharge valves of casting ladles

Well blocks are made as follows. The binding liquid used is a mixture of one part by volume of 640P I.M.S. and three parts by volume of a solution of 10.0 g magnesium acetate crystals in 100 ml of zirconium acetate solution. To 100 parts by weight of the mixture of sintered mullite of the same type as used in Example XIII, calcined alumina and tabular alumina grains is added 5 parts by weight of DSP2 'fines' magnesia. 65 ml of the binding liquid per pound of refractory grain gives a slurry which has a setting time of about 5 minutes. The 'green strength' was very good. A suitable firing schedule is 1550°–1600° C., gradually increasing over a period of three hours.

Example XXXI

Manufacture of orifice rings for pouring molten glass in bottle manufacture

Orifice rings may be made using dead burned magnesia as gelling agent with a solution of magnesium acetate in zirconium acetate solution. To a suitable refractory mix is added 5% by weight of DSP2 "fines" magnesia. The binding liquid is a mixture of one part by weight of 640P I.M.S. and either two or three parts by volume of a solution of 10.0 g magnesium acetate crystals in 100 ml of zirconium acetate solution.

Example XXXII

Preparation of piece moulds

Using as refractory grain a powder mix comprising:
Zircon sand—⅓ part by weight
Zircon flour—⅓ part by weight
Calcined fireclay—⅓ part by weight
Suitable proportions are 140 g dead burned magnesia fines with 1590 g of the above refractory grain, together with 125 ml zetabond C and 125 ml of ethyl alcohol. The setting time of the slurry is about 100 seconds. Leave for 100–120 seconds before stripping from the pattern. This gives a mould with good surface finish, good reproduction of detail, also adequate strength after burning off the alcohol solvent.

With 50 g dead burned magnesia fines, the setting time of the slurry is about 5 minutes.

A strong mould may be obtained by using 140 g dead burned magnesia fines with 1590 g of the above refractory grain, together with 10.0 g borax dissolved in 125 ml zetabond C, with 125 ml ethyl alcohol. The setting time of the slurry is about 5 minutes. Mould had good surface finish and good reproduction of detail. After burning off the alcohol solvent a stronger mould was obtained.

Moulds, part-moulds or cores may be made by the above technique, in which the powdered refractory aggregate is mixed with the binder to form a pourable slurry and including the steps of igniting the solvent alcohol escaping from the surface of the mould as soon as the slurry is set by gelling, the mould being supported during the burning of the alcohol in such a way that there is free circulation around all surfaces of the mould so that ignition and burning of the alcohol occurs evenly from all surfaces. This type of process is described in British Pat. No. 716,394. The moulds part-moulds or cores are suitable for the coating of metals and/or alloys.

Example XXXIII

Manufacture of piece moulds having a mixture of Steetley MCH powder grains

Component No. 1 is a mixture of the following MCH powder grains, parts by weight:
MCH −7+22—2 parts
MCH 85—1 part
MCH 200—2 parts
Component No. 2 is MCH 3/16+7
Suitable proportions are:
Component No. 1—380 parts
Component No. 2—140 parts This powder mix was used with 5.0 g borax dissolved in 125 ml zetabond C and 125 ml ethyl alcohol. The time required to mix the slurry was about 30 seconds, the setting time of the slurry being about 3 minutes. Leave for about 5 minutes before stripping the pattern. The mould had a good surface finish and good reproduction of detail. A strong mould was obtained on burning off the alcohol solvent.

Moulds, part-moulds or cores may be made by the above techniques in which the powdered refractory aggregate is mixed with the binder to form a pourable slurry and including the steps of igniting the solvent alcohol escaping from the surface of the mould as soon as the slurry is set by gelling, the mould being supported during the burning of the alcohol in such a way that there is free circulation around all surfaces of the mould so that ignition and burning of the alcohol occurs evenly from all surfaces. This type of process is described in British Pat. No. 716,394. The moulds, part-mould or cores are suitable for the casting of metals and/or alloys.

Experiments with zirconium formate solution

Zirconium formate is available as an aqueous solution containing approximately 22% $ZrO_2$. The following conditions were found to produce rigid coherent gels from this solution.

Using solution of 40 g magnesium acetate crystals ($4H_2O$) in 100 ml zirconium formate solution

| 10ml solution + 5ml of solution comprising | triethanolamine | - 2 volumes | - Tgel |
| --- | --- | --- | --- |
| | water | - 1 volume | 45 sec |
| | 640P I.M.S. | - 1 volume | |
| 10ml solution + 4ml solution solution comprising | triethanolamine | - 1 volume | - Tgel |
| | water | - 1 volume | 30 sec |

Using solution of 20 g fructose in 100 ml zirconium formate solution

| 10ml solution + 4ml solution solution comprising | triethanolamine | - 1 volume | - Tgel |
| --- | --- | --- | --- |
| | water | - 1 volume | between 10 and 15 min. |

Using solution of 40 g fructose in 100 ml zirconium formate solution, with gelation agent comprising triethanolamine - 1 volume; water - 1 volume

| 10ml solution + 3ml gelation agent | - Tgel 25 mins. |
| --- | --- |
| 10ml solution + 4ml gelation agent | - Tgel 25 mins. |
| 10ml solution + 5ml gelation agent | - Tgel 35 secs. |
| 10ml solution + 6ml gelation agent | - Tgel 2½ mins. - soft gel |
| 10ml solution + 7ml gelation agent | - Tgel about 1 hour |

Using solution of 40 g sorbitol in 100 ml zirconium formate solution, with gelation agent comprising triethanolamine - 1 volume; water - 1 volume

| 10ml solution + 4ml gelation agent | - Tgel = 10 secs. |
| --- | --- |
| 10ml solution + 5ml gelation agent | - Tgel = 10 secs. |
| 10ml solution + 6ml gelation agent | - Tgel = 10 secs. |

Using solution of 20 g glycine in 100 ml zirconium formate solution, with gelation agent comprising triethanolamine - 1 volume; water - 1 volume

| 10ml solution + 4ml gelation agent | - no gel after 17 mins. |
| --- | --- |
| 10ml solution + 5ml gelation agent | - Tgel = 1 min. gel which was a little soft became quite turbid on standing |
| 10ml solution + 6ml gelation agent | - Tgel = 25 secs. Turbid gel. |

Example XXXIV

Use of Steetley Ceramic Powder (spinel containing) and Ammonium Zirconium Carbonate (AZC solution)

A crucible was prepared by mixing 35 ml of AZC solution with 200 g of a refractory aggregate comprising of 2 parts by weight of MCH 200 powder and 4 parts by weight of MCH −14+25 powder. The resulting slurry was poured into a crucible mould, which was being vibrated. The slurry set in about 4 minutes, becoming quite hard after 8 minutes. The object was removed from the mould then air dried and fired at 1580° C. to give a crucible.

An alternative refractory aggregate (termed Mix D) is:

3 parts by weight—MCH−8+25
3 parts by weight—MCH−14+25
1 part by weight—MCH 85
2 parts by weight—MCH 150
2 parts by weight—MCH 200

A crucible was prepared by mixing 30 ml of AZC solution with 200 g of Mix D. The resulting slurry was poured into a crucible mould which was being vibrated. The slurry had a working time of about 3 minutes. The object was removed from the mould in about 10 minutes, then air dried and fired at 1580° C. to give a crucible.

Experiments using Steetley Ceramic Powder

The refractory aggregate used was Mix D.

Using zirconyl chloride solution (170 g $ZrOCl_2.8H_2O$ in 110 ml $H_2O$)

200 g Mix D with 30 ml of solution—slurry had 2 minutes working time—strip in 5 minutes. Good green strength. Better results obtained using 200 g Mix D with 15 ml of solution and 15 ml 64 OP I.M.S.

Using zirconium formate solution

Satisfactory crucible made using 200 g Mix D with 30 ml of zirconium formate solution. Removed from mould after 3 minutes.

Using Zirconium acetate solution (i) 200 g Mix D with 30 ml zirconium acetate solution gave 4 minutes working time, remove from mould after 5 minutes.

(ii) 200 g Mix D with 30 ml of solution of 10 g magnesium acetate ($4H_2O$) crystals in 100 ml of zirconium acetate solution gave 4 minutes working time, remove from mould after 4½ minutes.

(iii) 200 g Mix D with 30 ml of solution of 40 g magnesium acetate ($4H_2O$) crystals in 100 ml of zirconium acetate solution gave a flexible moulding, still plastic after 12 minutes, remove from mould after 16 minutes.

(iv) 200 g Mix D with 20 ml of solution of 10 g glycine in 100 ml of zirconium acetate solution plus 10 ml 640P I.M.S. gave a maximum of 6 minutes working time, remove from mould in 14 minutes - pliable.

(v) 200 g Mix D with 30 ml of solution of 10 g betaine in 100 ml of zirconium acetate solution gave a slurry with a working time of 4½ minutes, remove from mould in 6 minutes. Good surface finish. Similar results obtained using solution of 20 g betaine in 100 ml of zirconium acetate solution, with or without the addition of 640P I.M.S. Adding 640P I.M.S. gave a longer working time.

(vi) 200 g Mix D with 30 ml of a solution comprising 8 parts by volume of zirconium acetate solution with 2 parts by volume of syrupy ammonium lactate solution gave a slurry with a working time of 11 minutes, remove from mould in 40 minutes. Changing the composition of the solution to 9 parts by volume of zirconium acetate with 1 part by volume of syrupy ammonium lactate solution gave a slurry with a working time of 6 minutes, remove from mould in 10 minutes.

Example XXXV

Use of ammonium zirconium carbonate solution (AZC) to bond B40 refractory powder (A.P. Green Co. Missouri)

B40 refractory powder is a mixture of 60% Philipine Chrome ore refractory grains and 40% high purity dead burned magnesia grains, the latter substance providing the necessary gell inducement as well as providing refractory grains. Controll of the setting time when B40 powder is added to AZC solution is achieved by including an additional suitable gelation-delaying agent in the AZC solution. Information showing the effectiveness of gelation-delaying agents in controlling the rate of setting of slurries of B40 powder and AZC solution is given below. For the preparation of slurries, 200 g powder was mixed with 25 ml binding liquid.

1) Effect of sorbitol (a polyhydric alcohol)

| Wgt. of sorbitol (grms) dissolved in 100ml AZC solution | Setting time (mins) | |
|---|---|---|
| 10 | 2¾ | Very good strength development |
| 20 | 6 | |

2) Effect of fructose (a monosaccharide)

| Wgt. of fructose (gms) dissolved in 100ml AZC solution | Setting time (mins) | |
|---|---|---|
| 10 | 2¼ | Very good strength development |
| 20 | 3¼ | |

3) Effect of glycine

| Wgt. of glycine (gms) dissolved in 100ml AZC solution | Setting time (mins) | |
|---|---|---|
| 5 | 4¼ | Very good strength development |
| 10 | 10 | |

4) Effect of monoethanolamine (an aminoalcohol)

| % by volume of monoethanolamine in AZC solution | Setting time (mins) | |
|---|---|---|
| 5 | 5 | Good development of strength |
| 10 | 30 | |

5) Effect of 2-amino-2-methylpropan-1-ol 9 AMP (am aminoalcohol)

| % by volume of AMP in AZC solution | Setting time (mins) | |
|---|---|---|
| 10 | 4 | Good development of strength |
| 20 | 10 | |

6) Effect of tris(hydroxymethyl methylamine (Tris) (an aminoalcohol)

| Wgt. of tris (gms) dissolved in 100ml AZC solution | Setting time (mins) | |
|---|---|---|
| 5 | 4 | Good development of strength |
| 10 | 9 | |

Preparation of shaped refractory article

A tile was prepared by mixing 1300 g B40 powder (combined refractory powder and gell-incuding substance) with 160 ml of a solution containing 10 g glycine/100 ml AZC solution, then pouring the resulting slurry into a mould which was being vibrated. After 30 minutes, the piece was sufficiently hard to be stripped from the mould. It was then air dried and fired at 1530° C.

We claim:

1. A method of making a refractory article comprising:
   (a) preparing a liquid, flowable slurry by combining a refractory powder, an aqueous solution of a zirconium salt which when dissolved in water yields an aqueous solution that is alkaline, a gellation-inducing agent, and a gellation-delaying agent; said gellation-inducing agent being selected from the group consisting of dead burned magnesium powder and powdered magnesia-containing spinel, and said gellation-delaying agent being selected from the group consisting of magnesium acetate, magnesium lactate, ammonium lactate, glycine, betaine, fructose, a polyhydric alcohol selected from the group glycerol, sorbitol and mannitol and the aminoalcohols; the amounts of refractory powder, solution of zirconium, salt, gellation-inducing agent and gellation-delaying agent being such that the slurry will set to a coherent state upon standing;
   (b) pouring the slurry while liquid into a mould;
   (c) allowing the slurry in the mould to set to form a coherent green shape; and,
   (d) removing the green shape from the mould, drying the green shape and firing the dried green shape to form a sintered refractory article.

2. A method of making a refractory article comprising:
   (a) preparing a liquid flowable slurry by combining a refractory powder and dead burned magnesia powder, an aqueous alkaline solution of ammonium zirconium carbonate and a gellation delaying agent selected from the group consisting of sorbitol, fructose, glycine and aminoalcohols; the amounts of refractory powder, solution of zirconium, salt, dead burned magnesia and gellation-delaying agent being such that the slurry will set to a coherent state upon standing;
   (b) pouring the slurry while liquid into a mould;
   (c) allowing the slurry in the mould to set to form a coherent green shape; and,
   (d) removing the green shape from the mould, drying the green shape and firing the dried green shape to form a sintered refractory article.

* * * * *